(12) United States Patent
Gilpatrick et al.

(10) Patent No.: US 9,888,626 B2
(45) Date of Patent: Feb. 13, 2018

(54) NOISE-REDUCING MOWER BLADE

(71) Applicant: Briggs & Stratton Corporation, Wauwatosa, WI (US)

(72) Inventors: Richard J. Gilpatrick, Whitewater, WI (US); Ryan S. Jaskowiak, Mukwonago, WI (US); Jacob A. Matznick, Mount Calvary, WI (US); Tom Lanser, Hartland, WI (US); Gary Joseph Gracyalny, Elm Grove, WI (US); Brett Birschbach, Wauwatosa, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 33 days.

(21) Appl. No.: 14/629,194

(22) Filed: Feb. 23, 2015

(65) Prior Publication Data
US 2015/0163999 A1  Jun. 18, 2015

Related U.S. Application Data

(62) Division of application No. 13/785,992, filed on Mar. 5, 2013, now abandoned.

(60) Provisional application No. 61/622,995, filed on Apr. 11, 2012, provisional application No. 61/708,528, filed on Oct. 1, 2012.

(51) Int. Cl.
*A01D 34/73* (2006.01)
*A01D 34/82* (2006.01)

(52) U.S. Cl.
CPC .......... *A01D 34/73* (2013.01); *A01D 34/733* (2013.01); *A01D 34/826* (2013.01)

(58) Field of Classification Search
CPC ...... A01D 34/73; A01D 34/63; A01D 34/015; A01D 2101/00; A01D 34/733; A01D 34/826
USPC ..... 56/295, 255, 10.1, 14.7, 16.7, 17.5, 157; 30/276, 347
See application file for complete search history.

(56) References Cited

U.S. PATENT DOCUMENTS 1,512,484 A * 10/1924 Porter ..................... C23B 5/08
172/549
1,536,514 A * 5/1925 Mehls .................. A01D 34/664
56/295

(Continued)

FOREIGN PATENT DOCUMENTS

DE  22 37 324   2/1974
EP  1 637 027   3/2006

(Continued)

OTHER PUBLICATIONS

International Search Report and Written Opinion of the International Searching Authority regarding Application No. PCT/US2013/035828, dated Jun. 28, 2013, 13 pages.

*Primary Examiner* — Thomas B Will
*Assistant Examiner* — Joan D Misa
(74) *Attorney, Agent, or Firm* — Foley & Lardner LLP

(57) ABSTRACT

A mower blade includes two symmetrical body portions disposed on either side of an axis of rotation, wherein each body portion includes a straight leading edge having a first sharpened edge formed along at least a portion of the leading edge, and a curved trailing edge having a second sharpened edge formed along at least a portion of the trailing edge, so that each body portion tapers to a rounded end.

11 Claims, 25 Drawing Sheets

(56) References Cited

U.S. PATENT DOCUMENTS

| | | | |
|---|---|---|---|
| 1,550,342 A * | 8/1925 | Cogley | 30/276 |
| 1,569,987 A * | 1/1926 | Lamberti | A01G 3/0535 172/41 |
| 1,744,597 A * | 1/1930 | Vasconcellos | 172/556 |
| 2,194,617 A | 3/1940 | Scott | |
| 2,484,511 A * | 10/1949 | Ingalls | A01D 34/63 56/295 |
| 2,571,455 A | 10/1951 | Keiper | |
| 2,697,323 A | 12/1954 | Horn | |
| 2,715,307 A | 8/1955 | Carter et al. | |
| 2,721,438 A | 10/1955 | O'Maley | |
| 2,799,985 A * | 7/1957 | Rosenberg | A01D 34/73 56/295 |
| 2,969,634 A | 1/1961 | Lannert | |
| 3,003,298 A * | 10/1961 | Wininger | 56/13.8 |
| 3,022,621 A | 2/1962 | Zavarella | |
| 3,109,275 A | 11/1963 | Dunlap et al. | |
| 3,129,549 A * | 4/1964 | Stauffer | A01D 34/005 56/14.7 |
| 3,140,575 A * | 7/1964 | Ott | A01D 34/73 56/295 |
| 3,191,371 A * | 6/1965 | Brewer | A01D 34/63 56/295 |
| 3,220,170 A * | 11/1965 | Smith et al. | 56/255 |
| 3,242,660 A | 3/1966 | Gary | |
| 3,302,377 A * | 2/1967 | Ely | A01D 34/63 56/295 |
| 3,340,682 A | 9/1967 | Ely | |
| 3,343,350 A | 9/1967 | Freelander et al. | |
| 3,343,355 A * | 9/1967 | Freedlander et al. | 56/295 |
| 3,389,541 A | 6/1968 | Freedlander et al. | |
| 3,392,516 A * | 7/1968 | Freedlander et al. | 56/295 |
| 3,398,517 A | 8/1968 | Freedlander et al. | |
| 3,636,685 A | 1/1972 | Speckman | |
| 3,683,606 A | 8/1972 | Staines | |
| 3,894,385 A | 7/1975 | Brown, Jr. | |
| 3,987,607 A * | 10/1976 | Bone | A01D 34/66 56/16.2 |
| 3,998,037 A | 12/1976 | Deans et al. | |
| 4,189,903 A | 2/1980 | Jackson et al. | |
| 4,250,621 A | 2/1981 | Houle | |
| 4,302,878 A * | 12/1981 | Bonforte | 30/347 |
| 4,318,268 A | 3/1982 | Szymanis | |
| 4,586,257 A | 5/1986 | Rittenhouse | |
| 4,611,459 A | 9/1986 | Cartner | |
| 4,628,672 A | 12/1986 | Jones | |
| 4,651,510 A * | 3/1987 | Malutich | A01D 34/733 56/13.4 |
| 4,712,364 A | 12/1987 | Oxley | |
| 4,765,127 A * | 8/1988 | Hamblen | 56/295 |
| 4,893,457 A * | 1/1990 | Castain | A01D 34/73 56/295 |
| 5,094,065 A | 3/1992 | Azbell | |
| 5,148,660 A * | 9/1992 | Will | 56/295 |
| 5,209,052 A | 5/1993 | Carroll | |
| 5,284,006 A | 2/1994 | Sheldon | |
| 5,327,710 A * | 7/1994 | Plamper et al. | 56/255 |
| 5,394,612 A * | 3/1995 | Wolfington | 30/347 |
| 5,456,095 A | 10/1995 | Tawil et al. | |
| 5,501,068 A | 3/1996 | Martz | |
| D389,382 S * | 1/1998 | Houle | D8/8 |
| 5,711,141 A | 1/1998 | Pitman et al. | |
| 6,205,755 B1 | 3/2001 | Bontrager et al. | |
| D440,580 S | 4/2001 | Cooper et al. | |
| 6,415,591 B1 * | 7/2002 | Tylka, Sr. | 56/295 |
| 6,427,341 B1 | 8/2002 | Lee | |
| 6,446,346 B1 | 9/2002 | Castleman | |
| 6,470,662 B1 * | 10/2002 | Burke et al. | 56/255 |
| 6,487,840 B1 | 12/2002 | Turner et al. | |
| 6,688,095 B2 | 2/2004 | Wadzinski | |
| 6,777,846 B2 | 8/2004 | Feldner et al. | |
| D502,185 S * | 2/2005 | Byrne | D15/17 |
| D524,827 S | 7/2006 | Byrne | |
| 7,124,566 B2 | 10/2006 | Treger et al. | |
| 7,127,877 B2 | 10/2006 | Curran | |
| 7,200,982 B2 | 4/2007 | Vandyke | |
| 7,264,069 B2 | 9/2007 | Fiorenza et al. | |
| 7,392,853 B2 | 7/2008 | Baran | |
| 7,958,710 B2 | 6/2011 | Gilpatrick et al. | |
| D675,073 S | 1/2013 | Milburn | |
| 8,615,977 B2 * | 12/2013 | Campione | A01D 34/005 56/295 |
| 2005/0229573 A1 * | 10/2005 | Curran | 56/255 |
| 2006/0162310 A1 * | 7/2006 | Dittmer | 56/289 |
| 2009/0223193 A1 * | 9/2009 | Funnell | A01D 34/73 56/17.5 |
| 2012/0073258 A1 | 3/2012 | Stanley | |
| 2013/0239538 A1 * | 9/2013 | Gohsman | A01D 34/73 56/255 |
| 2013/0247531 A1 * | 9/2013 | Campione | A01D 34/73 56/295 |

FOREIGN PATENT DOCUMENTS

| | | |
|---|---|---|
| EP | 2 111 736 | 10/2009 |
| EP | 2 198 686 | 6/2010 |
| GB | 2 359 475 | 8/2001 |
| GB | 2 418 588 | 4/2006 |
| NL | 8303078 | 4/1985 |

* cited by examiner

NOISE-REDUCING MOWER BLADE

CROSS-REFERENCE TO RELATED PATENT APPLICATIONS

This application is a divisional of U.S. application Ser. No. 13/785,992, filed Mar. 5, 2013, which claims the benefit of U.S. Provisional Application No. 61/622,995, filed Apr. 11, 2012 and also claims the benefit of U.S. Provisional Application No. 61/708,528, filed Oct. 1, 2012, all of which are incorporated herein by reference in their entireties.

BACKGROUND

The present application relates to cutting systems used on lawn and garden equipment. Typically, lawn and garden equipment such as walk-behind lawn mowers, tractors, riding mowers, zero-turn radius mowers etc. cut grass or other vegetation with a cutter bar or bar blade. An example of a typical blade is shown in U.S. Pat. No. 5,711,141, which is herein incorporated by reference in its entirety. Such a blade is a substantially flat rectangular bar having a center point about which the blade rotates. Two or more sharpened edges are provided on opposing sides of the center point. The blade is spun about the center point to cut grass or vegetation. Typically the blade is attached (either directly or indirectly) to an internal combustion engine, electric motor or other prime mover. The blade is spun at a speed high enough to cut grass. Typical blade speeds can range from 2000 to 4000 rotations per minute (RPM). Typical cutting blades are also provided with structures to direct airflow in a desired direction. For example, a mulching blade may include two wings or similar shapes to direct air and grass in an upward direction to establish a vacuum below the blade, thereby causing the grass to stand up while being cut.

A shortcoming of typical bar blades is noise. The cutting blade, when spun at cutting speeds, is similar to a fan and can generate much of the noise associated with a lawn mower. A consumer may desire a mower with reduced noise or sound levels.

SUMMARY

One embodiment of the invention relates to a mower blade including a body including an axis of rotation about which the blade is configured to rotate, a first body portion extending in a first direction from the axis of rotation, and a second body portion extending in a second opposite direction from the axis of rotation, wherein the second body portion is asymmetrically shaped with respect to the first body portion such that the center of mass of the blade lies on the axis of rotation.

Another embodiment relates to a mower blade including two symmetrical body portions disposed on either side of an axis of rotation, wherein each body portion includes a leading edge having a first sharpened edge formed along at least a portion of the leading edge, and a trailing edge having a second sharpened edge formed along at least a portion of the trailing edge.

Another embodiment relates to a mower blade including a mounting structure defining an axis of rotation about which the lawn mower blade is configured to rotate, a cutting portion extending in a first direction from the axis of rotation, wherein the cutting portion includes a lift feature and a leading edge having a first sharpened edge formed along at least a portion of the leading edge, and a counterweight portion extending in a second direction from the axis of rotation, the counterweight portion including a counterweight so that the center of mass of the mower blade lies on the axis of rotation.

Alternative exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, in which.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Figure 1:
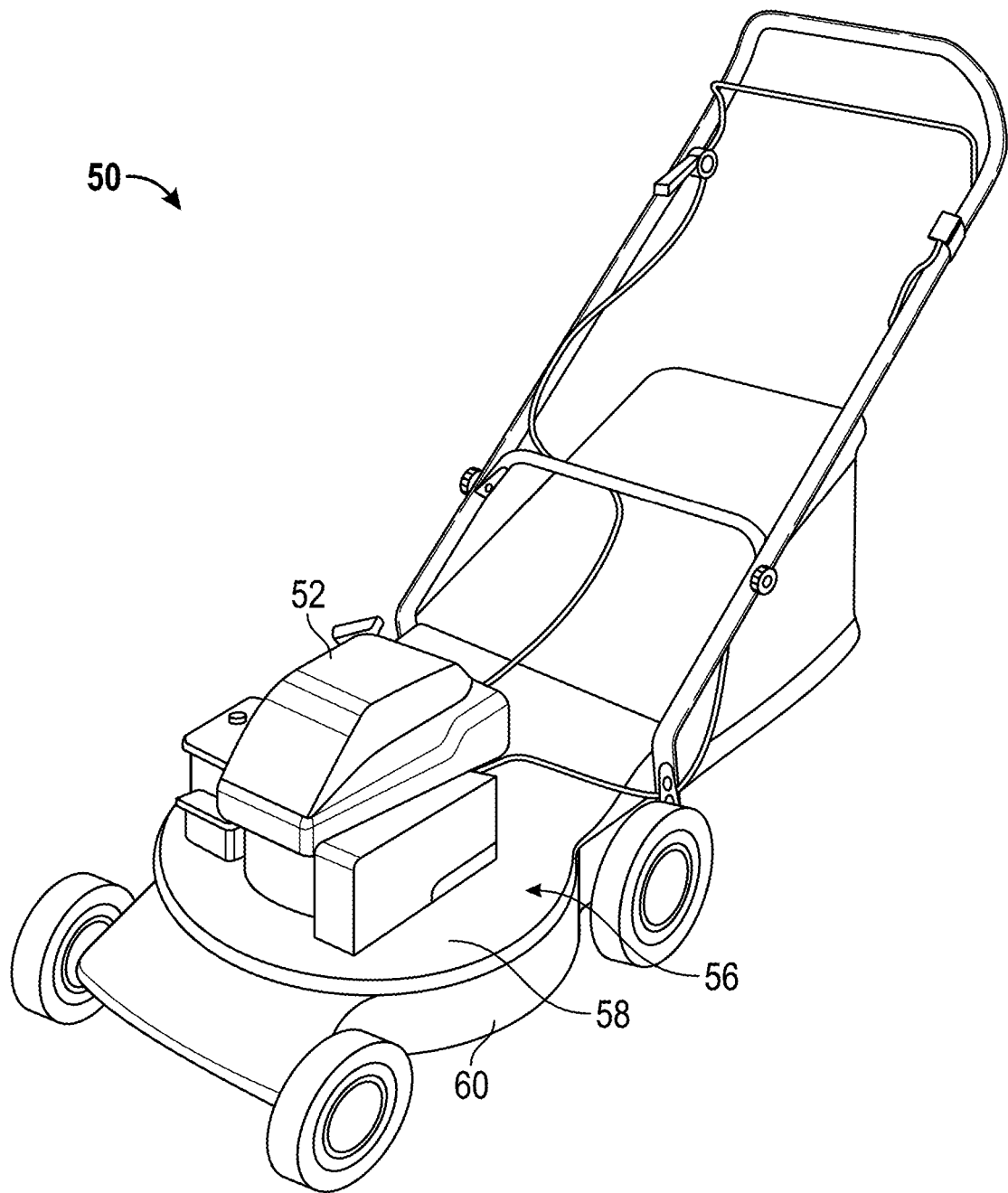
FIG. 1 is a perspective view of a lawn mower according to an exemplary embodiment.
Figure 2:
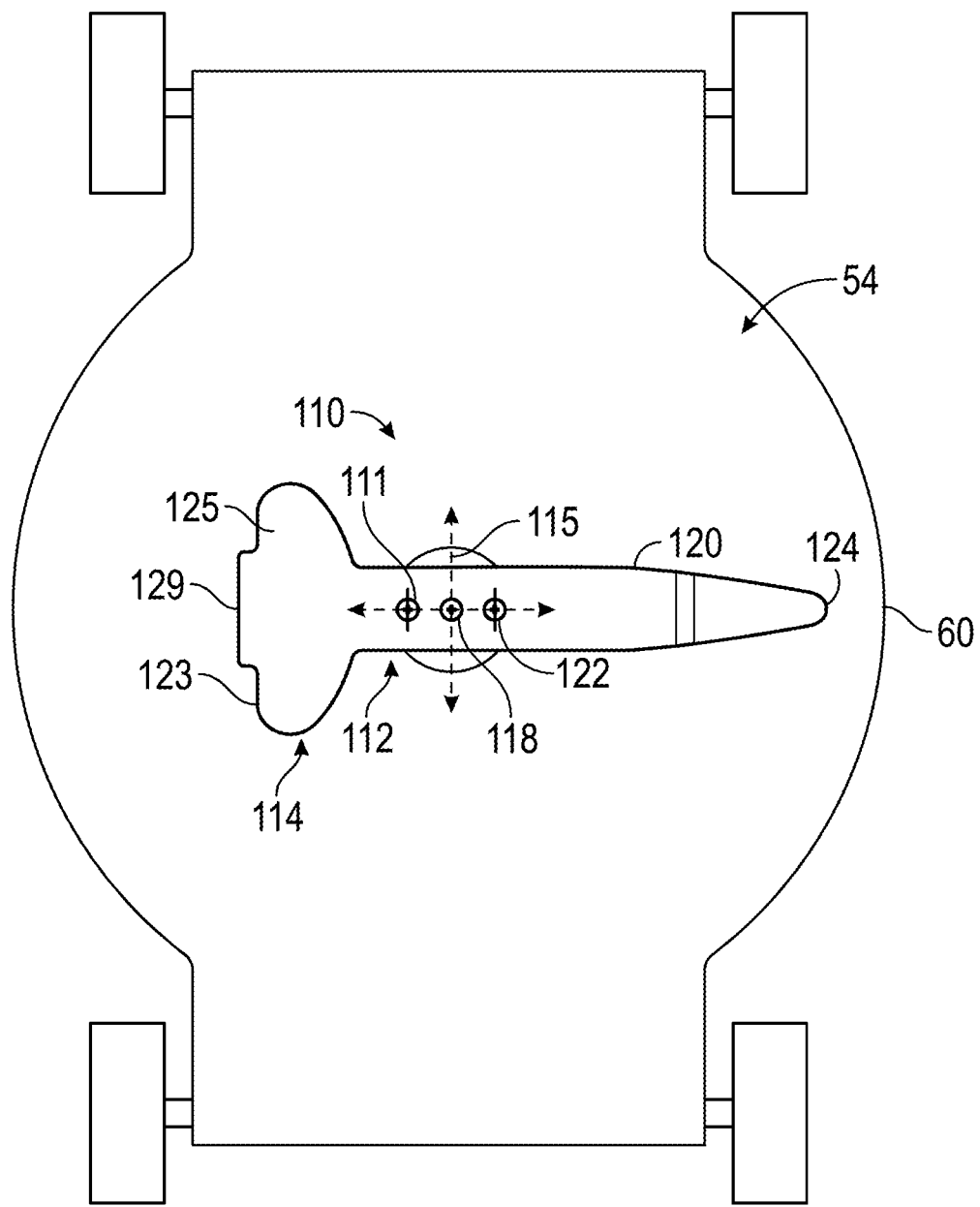
FIG. 2 is a bottom view of the lawn mower of FIG. 1.

Referring to FIGS. 1-2, a walk-behind lawn mower 50 according to an exemplary embodiment is illustrated. Lawn mower 50 includes a prime mover 52 (e.g., an internal combustion engine, an electric motor, etc.) that rotates a blade 110. Blade 110 is positioned within a cutting chamber 54 defined at least in part by a mower deck 56 that includes an upper surface 58 and a sidewall 60. Cutting chamber 54 is the space between the ground and the mower deck 56 in which blade 110 rotates during normal use.

Figure 3:
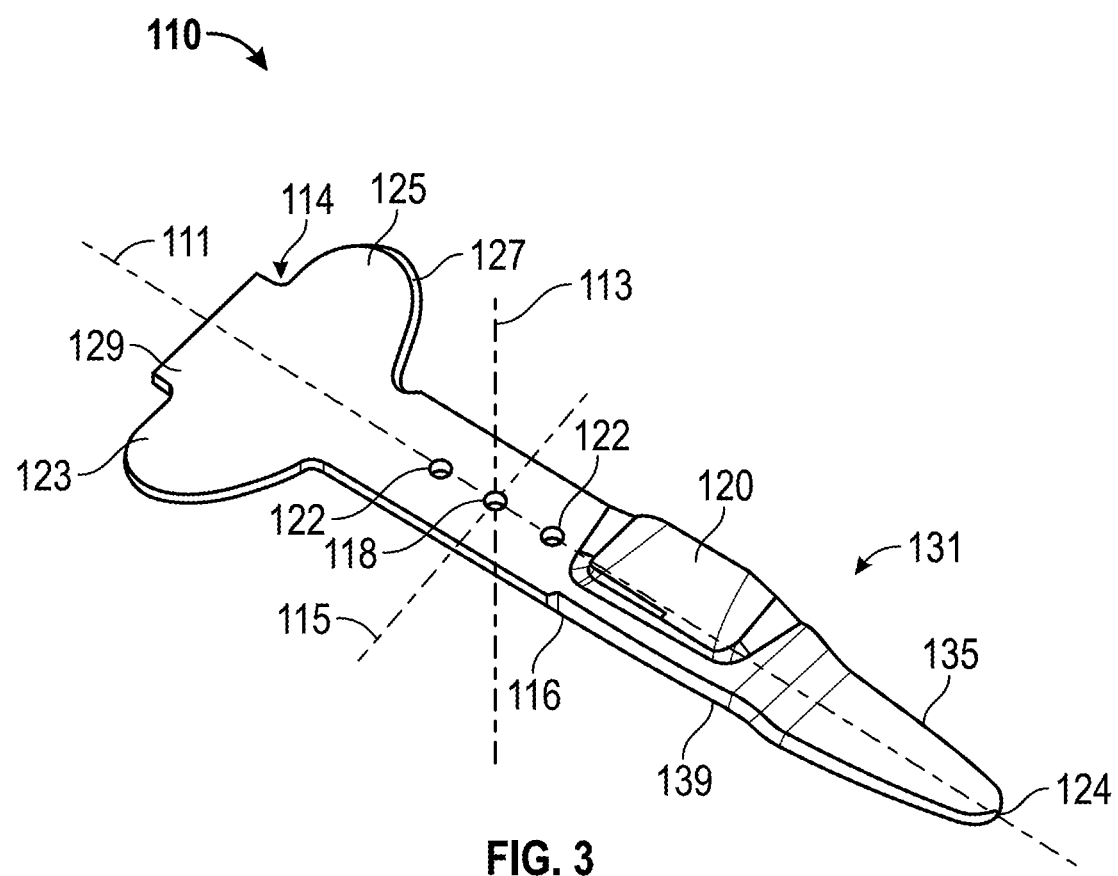
FIG. 3 is a perspective view of a lawn mower blade according to an exemplary embodiment.
Figure 4:
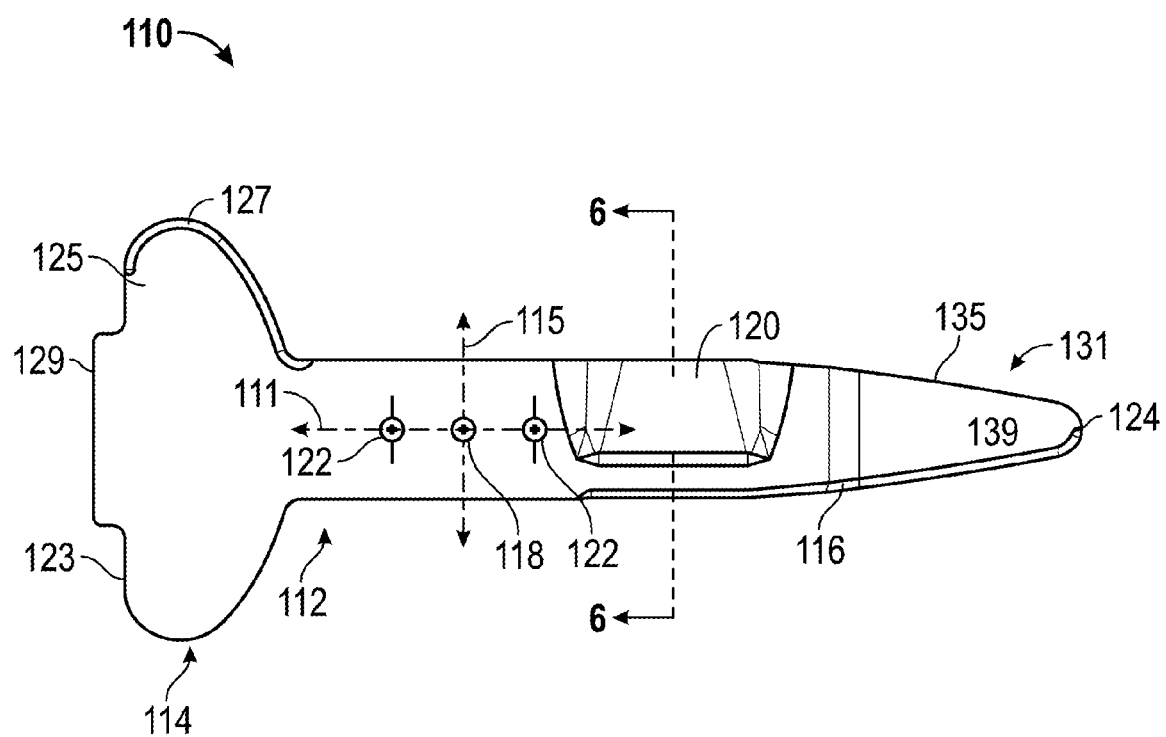
FIG. 4 is a top view of the lawn mower blade of FIG. 3.

Referring to FIGS. 3-6, blade 110 for lawn, grass or vegetation cutting is illustrated according to an exemplary embodiment. Blade 110 may be used on a walk-behind lawn mower as shown in FIGS. 1-2, a tractor, a riding mower, a zero-turn radius mower, or other suitable outdoor power equipment. Blade 110 includes a bar 112 and a counterweight 114. As illustrated in FIGS. 3-6, counterweight 114 is integrally formed with bar 112 as a single piece mower blade 110. For example, blade 110 can be stamped or cast as a single piece. In other embodiments, blade 110 is formed by multiple pieces fastened together (e.g., welded, bolted, riveted, assembled with fasteners, etc.). As shown in FIGS. 3 and 4, blade 110 has a longitudinal axis 111 that is substantially perpendicular to an axis of rotation 113 that extends through the blade's center of rotation and mounting hole 118. A transverse axis 115 is substantially perpendicular to both longitudinal axis 111 and axis of rotation 113.

Figure 5:
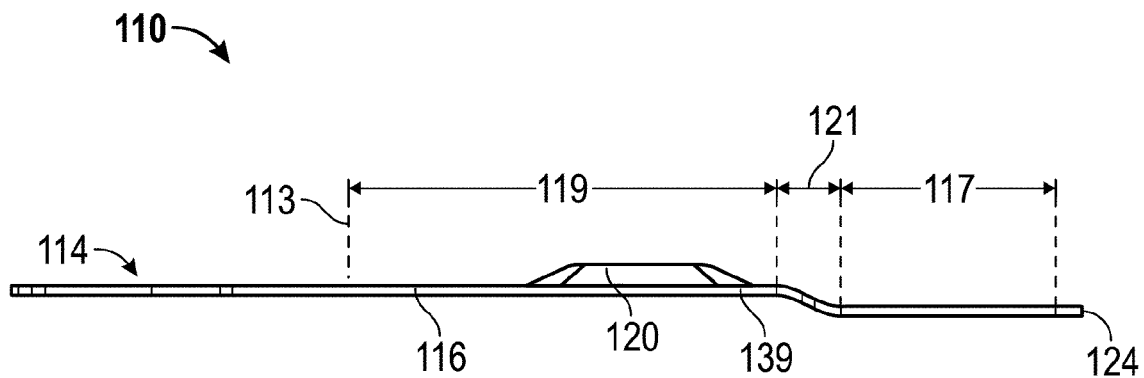
FIG. 5 is a front view of the lawn mower blade of FIG. 3.

Bar 112 is generally an elongated body and includes a leading edge 116, a trailing edge 135, mounting holes 118 and 122, a lift feature 120, and an end portion 124 opposite counterweight 114. As shown in FIG. 5, bar 112 also includes a cutting portion 117, a lift portion 119, and a transition portion 121.

Leading edge 116 is considered the "leading" edge of blade 110 because it leads with respect to the intended rotation of blade 110. With reference to FIG. 4, blade 110 is intended for clockwise rotation. Trailing edge 135 "trails" with respect to the intended rotation of blade 110 and is located opposite longitudinal axis 111 from leading edge 116 of blade 110. Sharpened or cutting portion or edge 139 extends along leading edge 116 from lift feature 120 of lift portion 119, along transition portion 121, and along cutting portion 117 to the midpoint of rounded end portion 124. Sharpened edge 139 is sharpened for cutting grass. In some embodiments, sharpened edge 139 extends for different lengths along leading edge 116 and end portion 124 of blade 110. For example, sharpened edge 139 can extend across a portion or the entirety of transition portion 121 and/or across a portion of lift portion 119. As blade 110 rotates sharpened edge 139 contacts grass or vegetation to provide the cutting action of the lawn mower. In some embodiments, one or more additional sharpened edges at other locations along blade 110 may be incorporated (e.g., to improve cutting performance).

Mounting hole 118 is located at axis of rotation 113. Mounting hole 118 is the primary mounting point to attach blade 110 to a mower, while mounting holes 122 provide supplemental mounting points for attaching blade 110 to the mower. Blade 110 may be mounted directly to an engine output shaft if, for example, blade 110 is installed on a small walk behind mower. Alternatively, blade 110 could be mounted to spindles that allow for rotation of blade 110, if for example, blade 110 is installed on a larger, multi-blade walk behind mower, tractor, riding mower, etc. Blade 110 is secured to that blade 110 is generally horizontal to axis of rotation 113. In some embodiments, mounting structures other than one or more mounting holes may be used for mounting blade 110 to a mower (e.g., a mounting boss, a mounting flange, a mounting stud, etc.).

Figure 6:
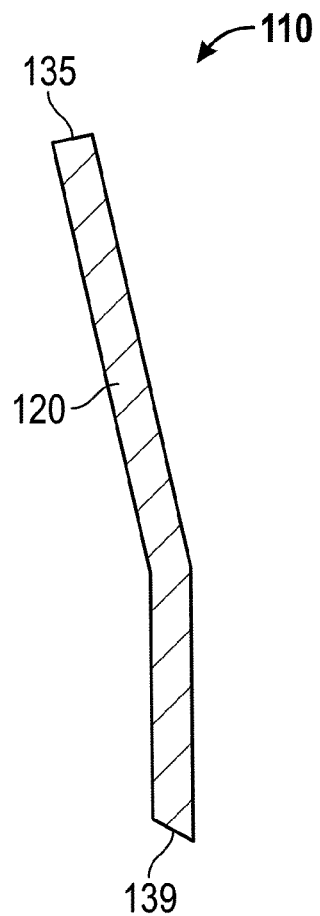
FIG. 6 is a sectional view along line 6-6 of the lawn mower blade of FIG. 4.
Figure 7:
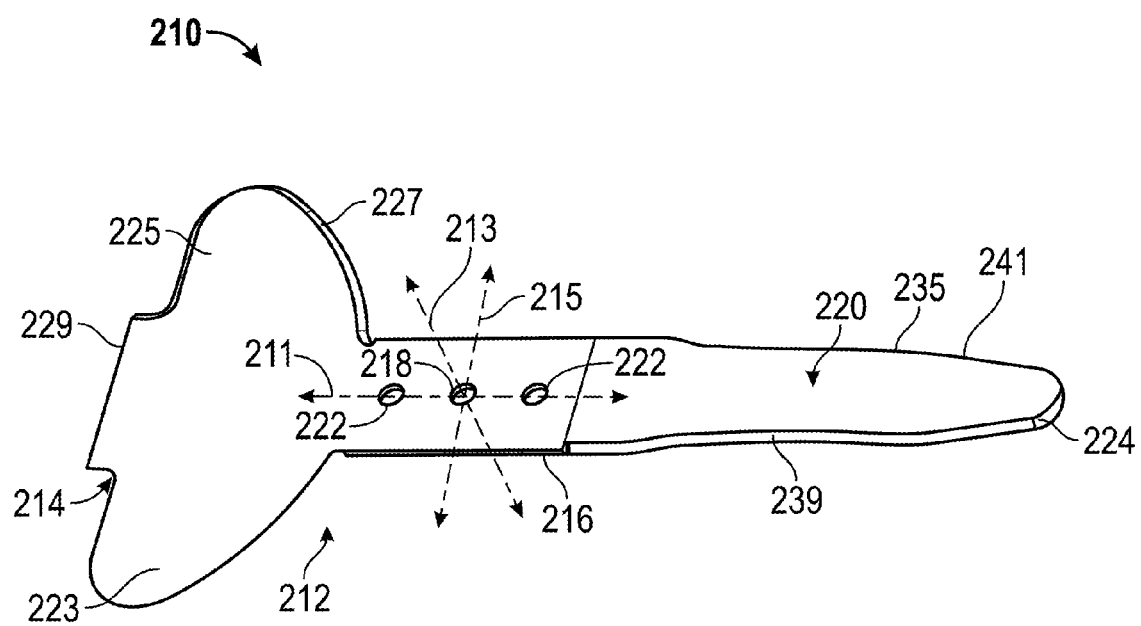
FIG. 7 is a perspective view of a lawn mower blade according to an exemplary embodiment.
Figure 8:
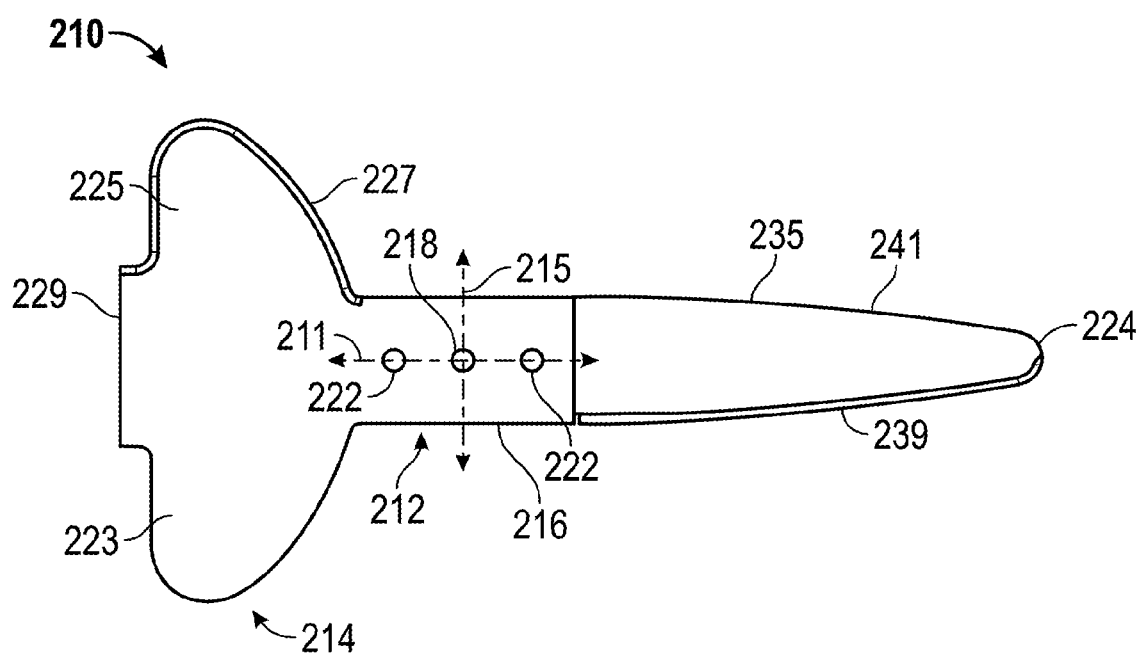
FIG. 8 is a top view of the lawn mower blade of FIG. 7.
Figure 9:
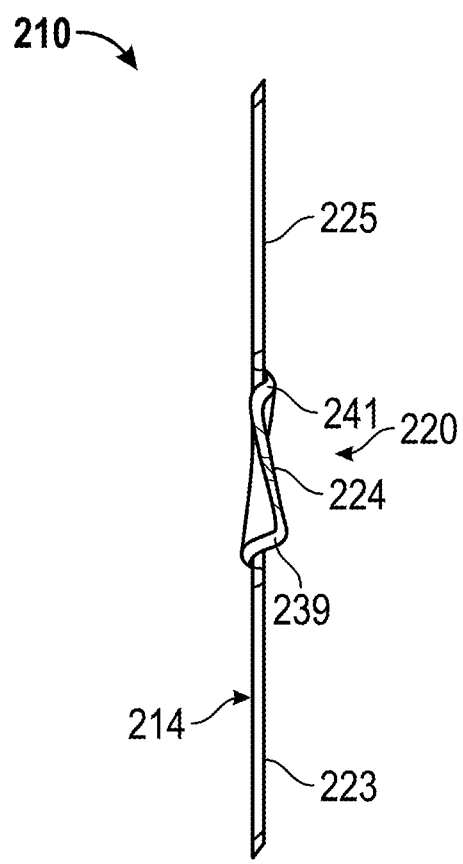
FIG. 9 is a side view of the lawn mower blade of FIG. 7.
Figure 10:
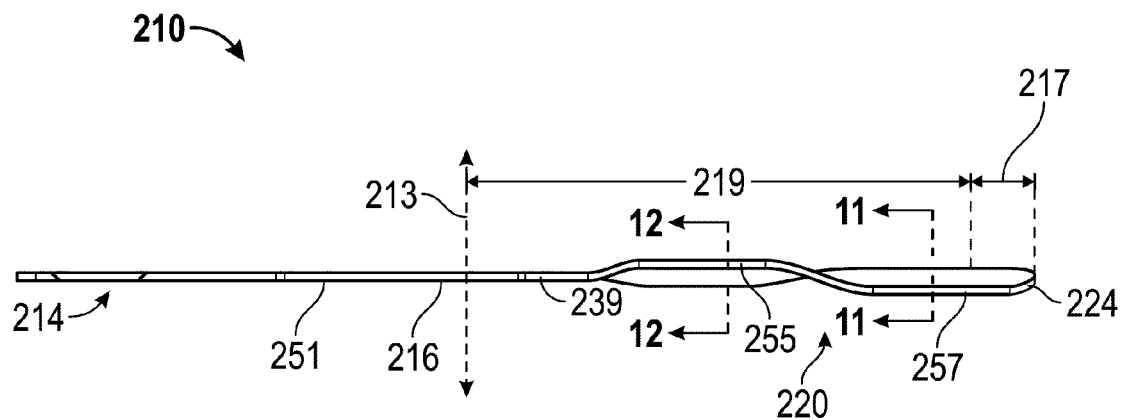
FIG. 10 is a front view of the lawn mower blade of FIG. 7.
Figure 11:
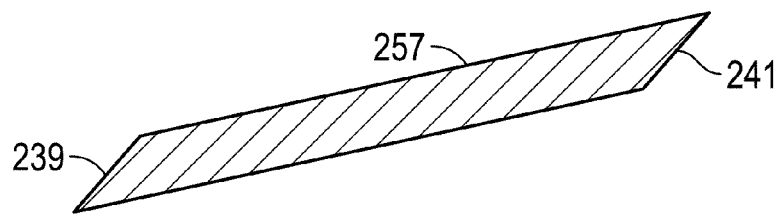
FIG. 11 is a sectional view along line 11-11 of the lawn mower blade of FIG. 10.
Figure 12:
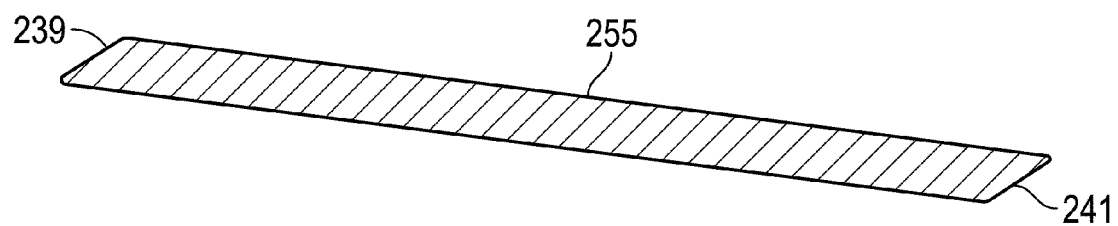
FIG. 12 is a sectional view along line 12-12 of the lawn mower blade of FIG. 10.
Figure 13:
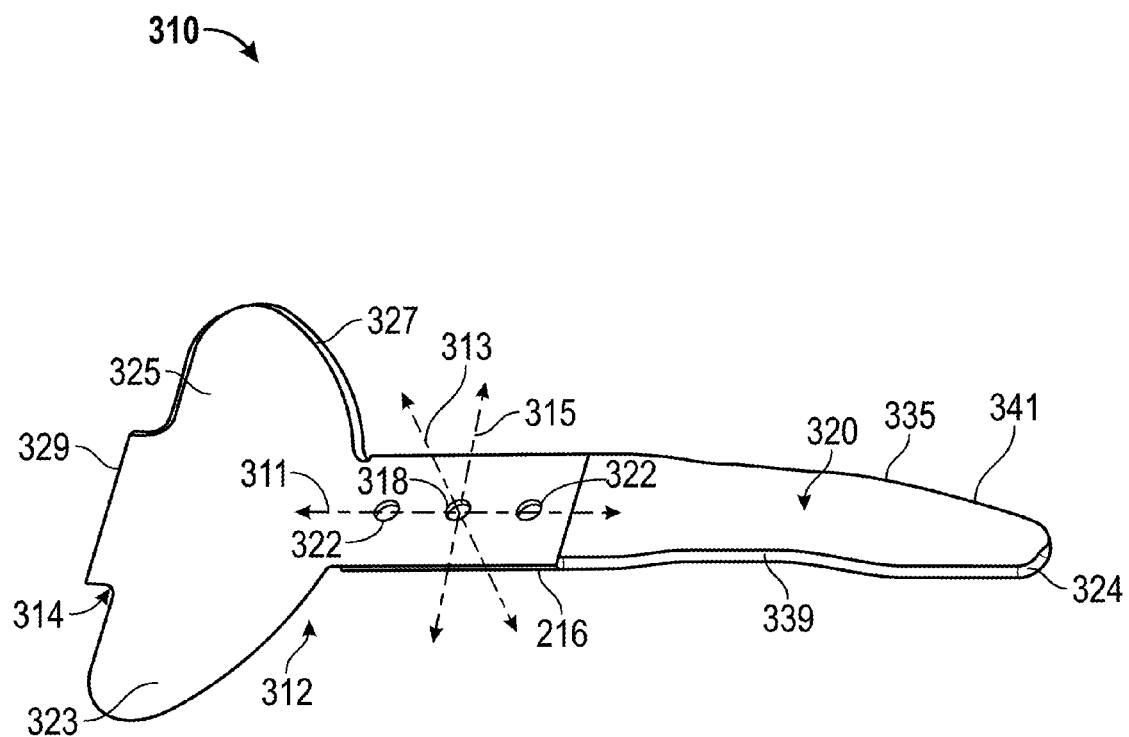
FIG. 13 is a perspective view of a lawn mower blade according to an exemplary embodiment.
Figure 14:
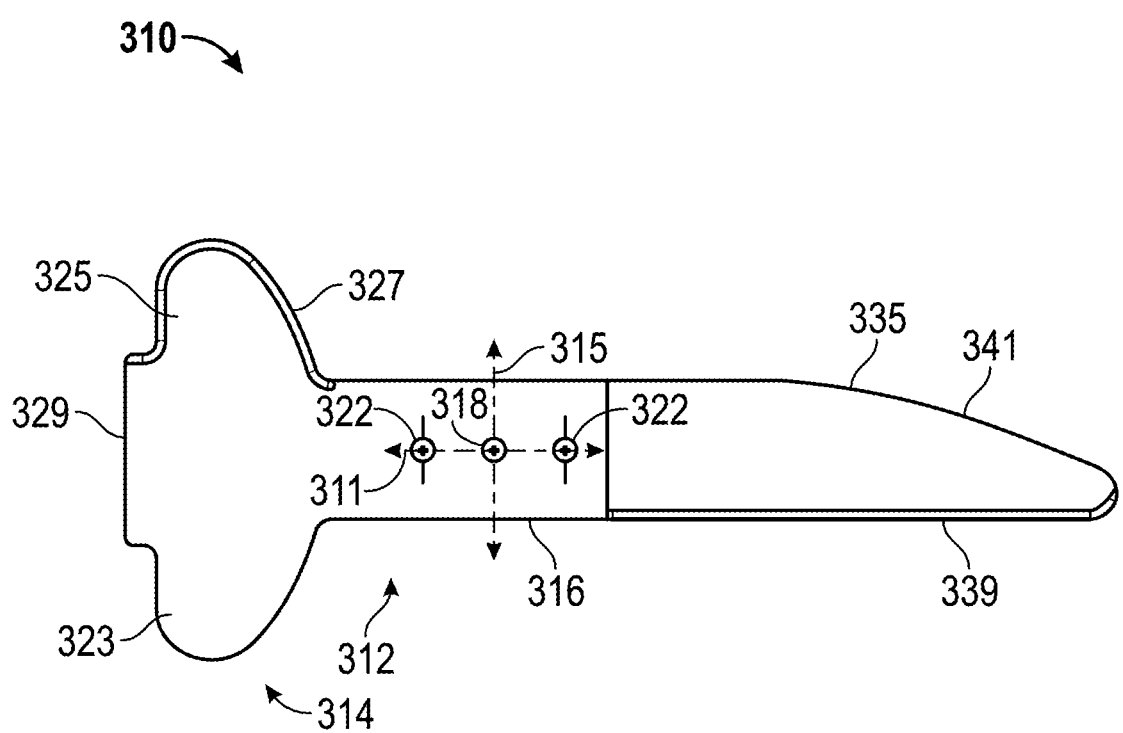
FIG. 14 is a top view of the lawn mower blade of FIG. 13.
Figure 15:
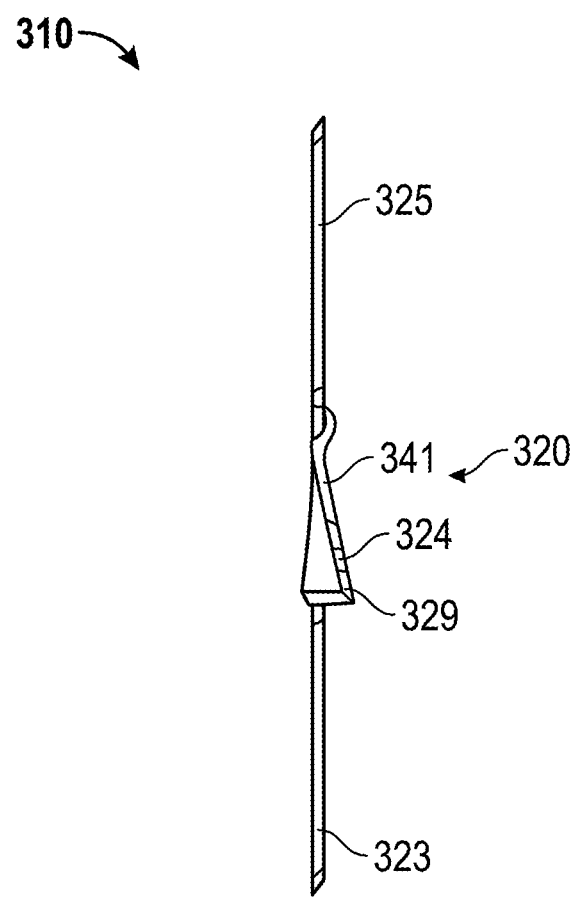
FIG. 15 is a side view of the lawn mower blade of FIG. 13.
Figure 16:
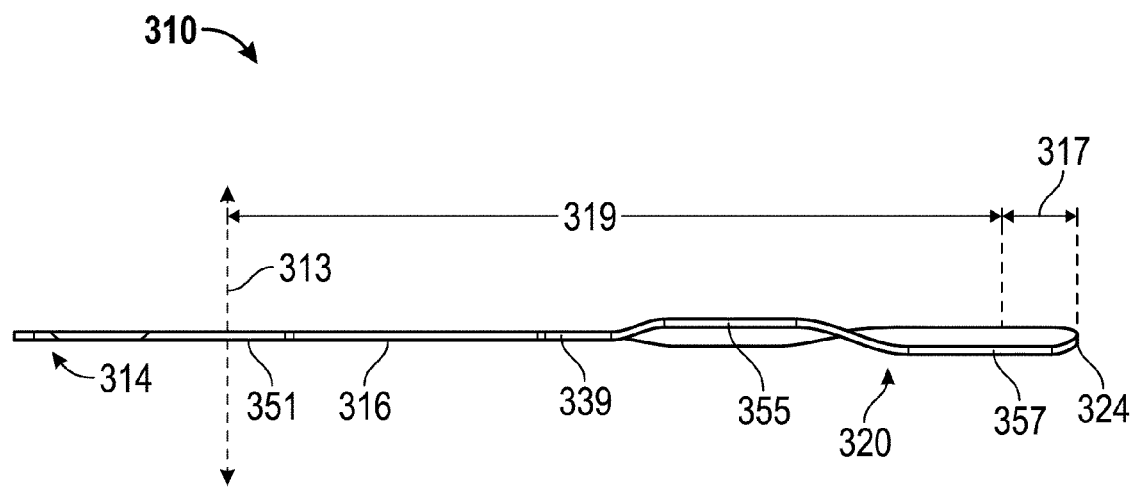
FIG. 16 is a front view of the lawn mower blade of FIG. 13.
Figure 17:
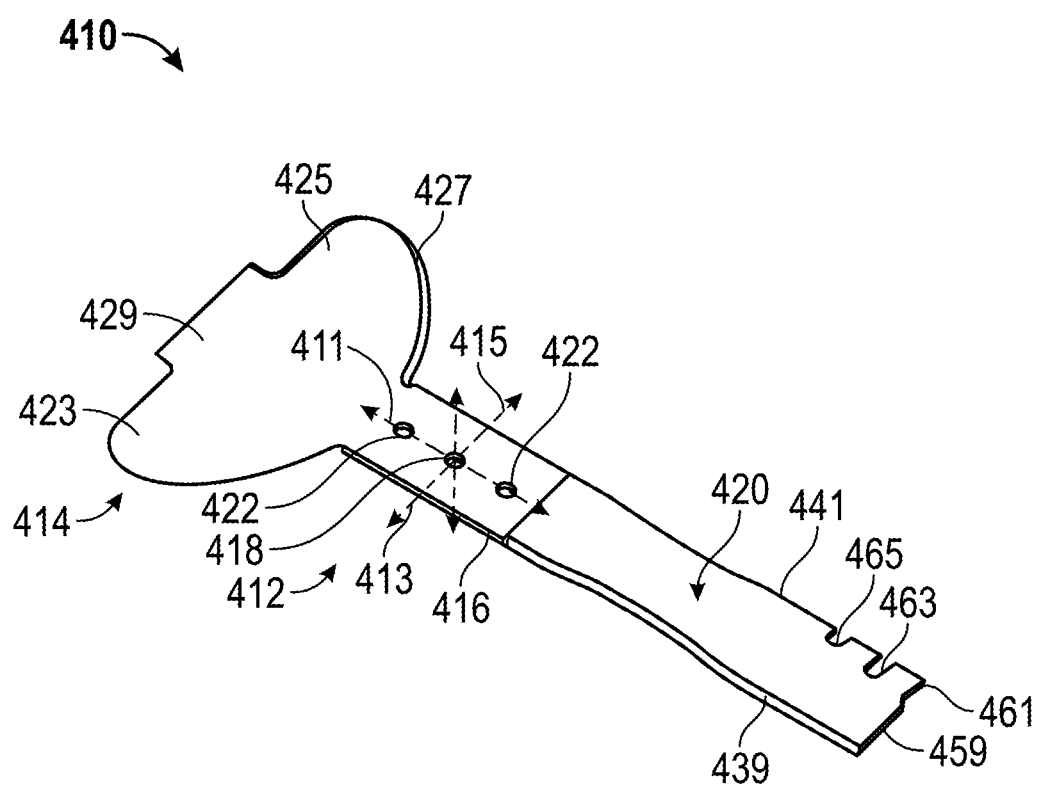
FIG. 17 is a perspective view of a lawn mower blade according to an exemplary embodiment.
Figure 18:
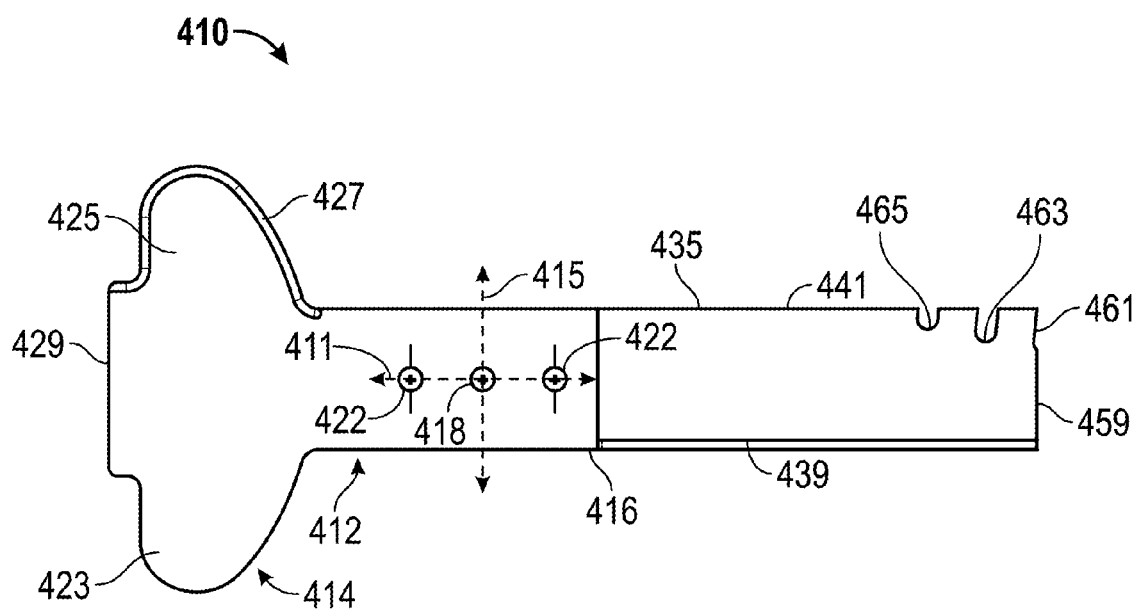
FIG. 18 is a top view of the lawn mower blade of FIG. 17.
Figure 19:
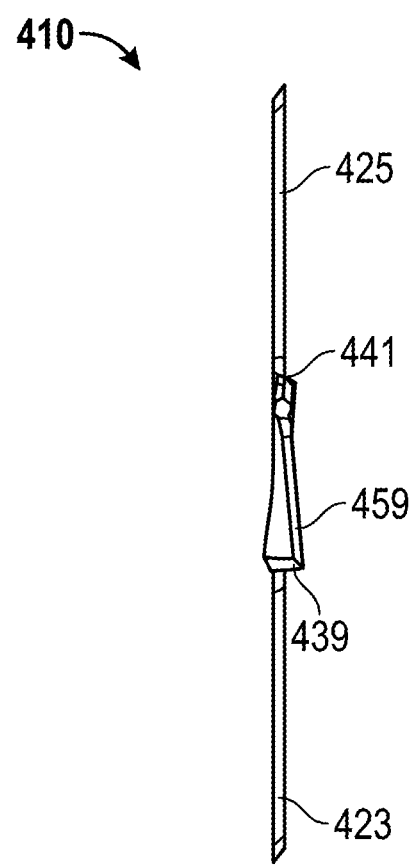
FIG. 19 is a side view of the lawn mower blade of FIG. 17.
Figure 20:
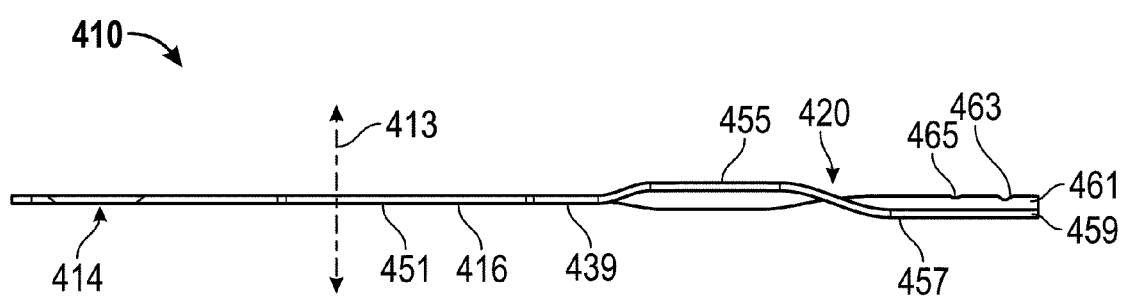
FIG. 20 is a front view of the lawn mower blade of FIG. 17.
Figure 21:
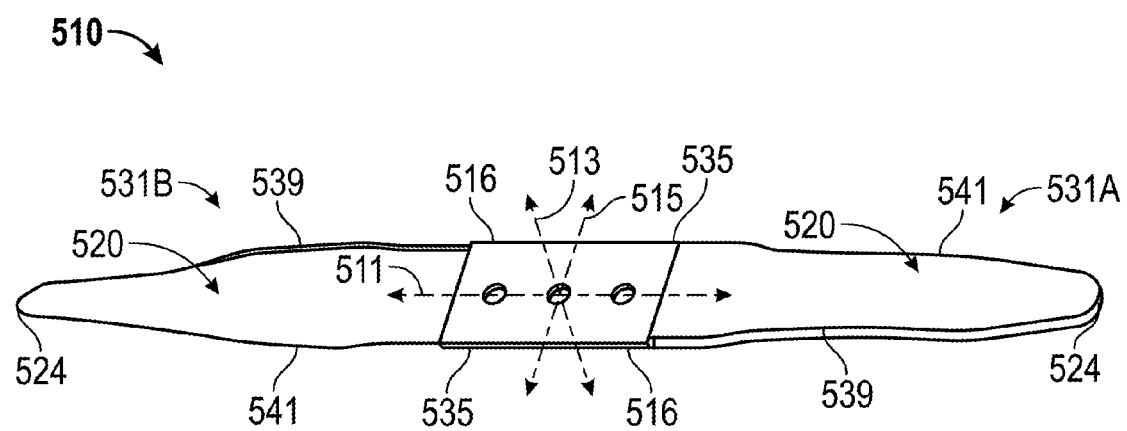
FIG. 21 is a perspective view of a lawn mower blade according to an exemplary embodiment.
Figure 22:
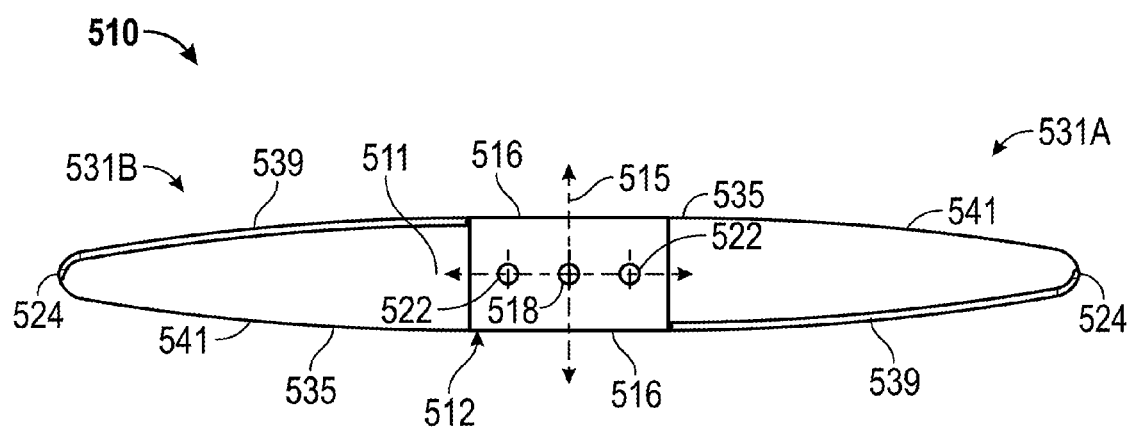
FIG. 22 is a top view of the lawn mower blade of FIG. 21.
Figure 23:
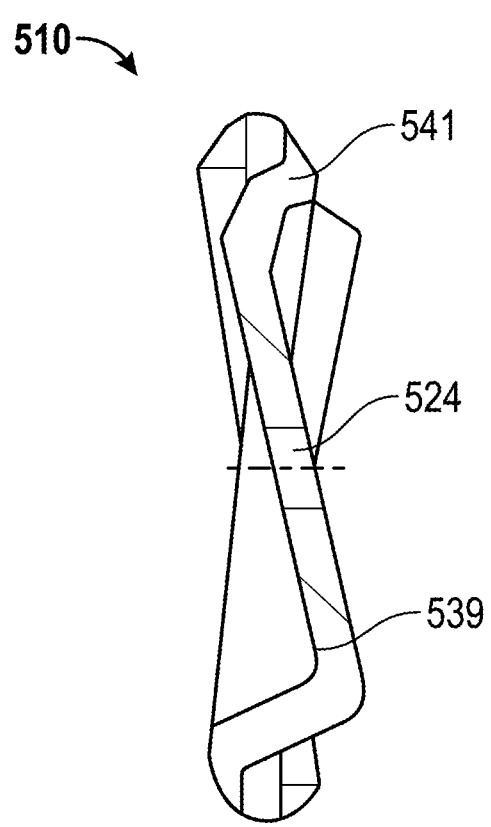
FIG. 23 is a side view of the lawn mower blade of FIG. 21.
Figure 24:
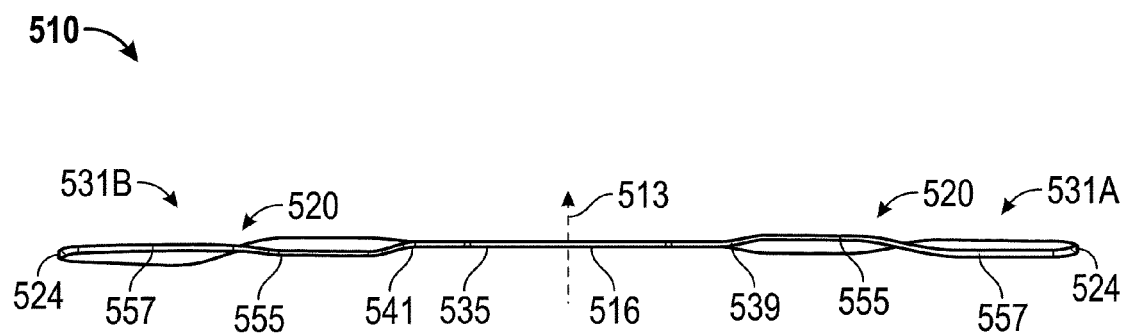
FIG. 24 is a front view of the lawn mower blade of FIG. 21.
Figure 25:
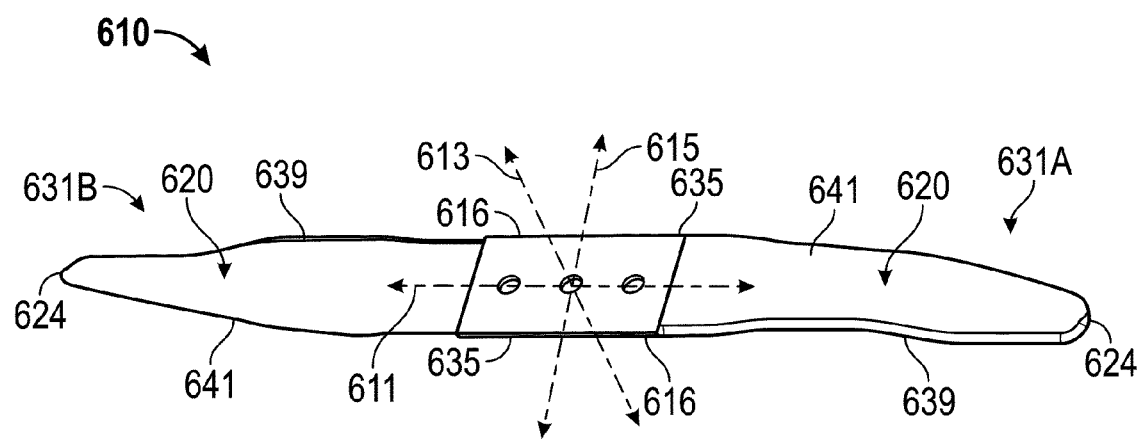
FIG. 25 is a perspective view of a lawn mower blade according to an exemplary embodiment.
Figure 26:
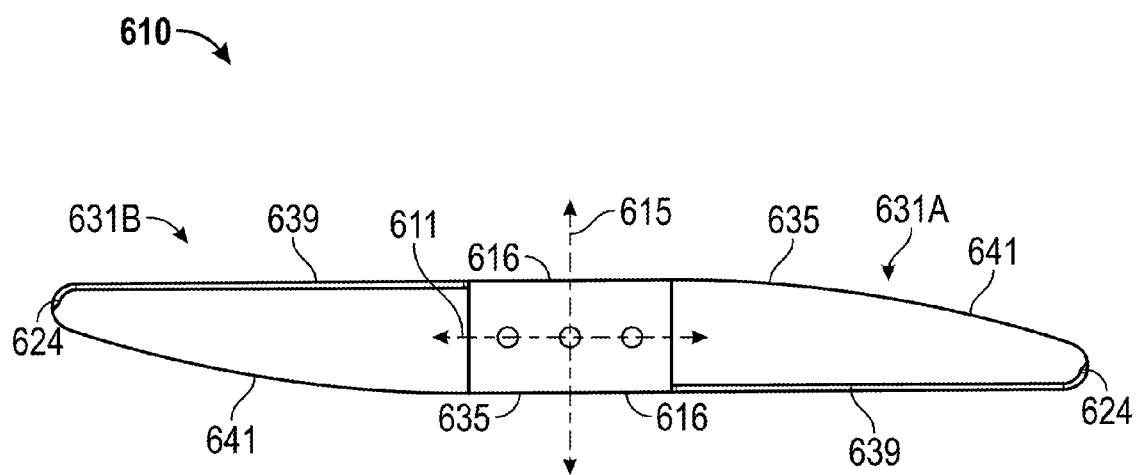
FIG. 26 is a top view of the lawn mower blade of FIG. 25.
Figure 27:
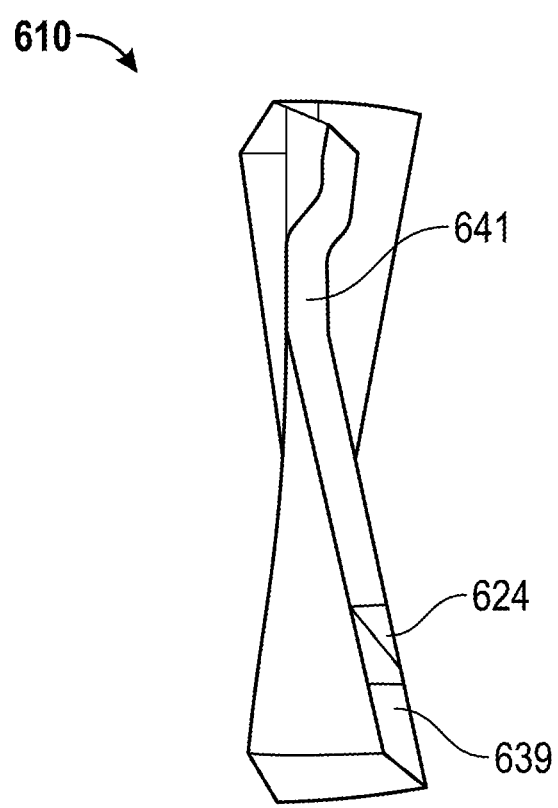
FIG. 27 is a side view of the lawn mower blade of FIG. 25.
Figure 28:
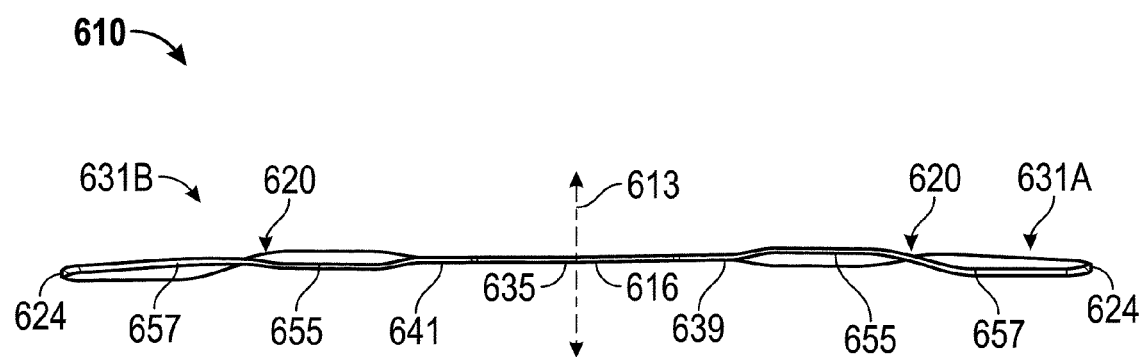
FIG. 28 is a front view of the lawn mower blade of FIG. 5.

FIG. 2 illustrates blade 110 positioned within cutting chamber 54 of mower deck 56. Lift feature 120 generates lift or a vacuum below blade 110 within the cutting chamber 54 as blade 110 rotates. The lift causes the grass within the cutting chamber to stand or raise up in a generally vertical direction, allowing for a better, more complete cut of the grass. It is believed that placement of lift feature 120 closer to the center of rotation of blade (i.e., axis of rotation 113) is advantageous with respect to sound generated by the motion of blade 110 in that lift feature 120 is traveling at a slower linear speed than the tip of blade 110 near cutting edge 116, thus generating less noise. Typical blades will provide one or more lifting airfoils at the outer or end portions of the blade, whereas blade 10 includes a single lift feature 120 provided closer to the center of rotation. In some embodiments, lift feature 120 extends from about 2.5 inches to 5.5 inches from the center or rotation of blade 110. In other embodiments, the size and placement of lift feature 120 varies. As shown in FIGS. 2-6, lift feature 120 comprises an airfoil. As shown in FIG. 6, airfoil is angled upward from the planar portion of lift portion 119. As shown in FIG. 6, airfoil angles upwards from an interior portion of blade 110. In other embodiments, airfoil angles upwards from leading edge 137. In other embodiments, other structures capable of producing lift due to rotation of blade 110 may be used in place of an airfoil (e.g., twisted region shown in FIGS. 7-11).

End portion 124 is rounded. Rounded end portion 124 acts to reduce the surface area at the end of bar 112 relative to a square end (i.e., not rounded), which is believed to reduce noise produced by blade 110 during rotation relative to a bar with a square end.

Cutting portion 117 is substantially planar. Lift portion 119 is substantially planar except for the lift feature 120. Transition portion 121 connects lift portion 119 to cutting portion 117 so that cutting portion 117 is offset (e.g., positioned lower along axis of rotation 113 when blade 110 is in its normal operating orientation, as shown in FIG. 3) from lift portion 119, with the planar regions of cutting portion 117 and lift portion 119 being generally parallel to one another.

The shape of counterweight 114 may be any suitable shape sufficient to balance blade 110 about axis of rotation 113. As shown in FIG. 2, counterweight 114 extends transversely outward from longitudinal axis 111 to a greater width than bar 112. Counterweight 114 includes two wings or extensions 123 and 125 that form the portions of counterweight 114 that are wider than bar 112. Extension 125 is located on the opposite side of blade 110 from leading edge 116 (with longitudinal axis 111 between the two). Second sharpened edge 127 extends along the leading edge of extension 125 and onto a portion of bar 112 (e.g. a fillet connecting extension 125 to bar 112). Similarly to sharpened edge 139, sharpened edge 127 contacts grass or vegetation as blade 110 rotates to provide the cutting action for a lawn mower. Second sharpened edge 127 helps to prevent the accumulation of grass clippings on counterweight 114. In some embodiments, counterweight 114 does not include second sharpened edge 127 or second sharpened edge extends along a portion of leading edge of counterweight 114.

A sacrificial or grinding portion 129 of counterweight 114 is located at the end of blade 110 opposite end portion 124. During use of blade 110, sharpened edges 116 and 127 will eventually dull. After sharpened edges 116 and 127 are re-sharpened, which removes material from sharpened regions 116 and 127, material may need to be removed from counterweight 114 to properly balance blade 110. Grinding portion 129 provides a convenient location from which material can be removed from counterweight 114 as needed to balance blade 110. Preferably, blade 110 is balanced in the x-direction (along longitudinal axis 111) and in the y-direction (along transverse axis 115). In the embodiment shown in FIGS. 1-4, blade 110 is not balanced in the z-direction (along axis of rotation 113) due to the change in elevation between lift region 119 and cutting region 117.

Blade 110 may be considered to have two sides or portions, one on either side of mounting hole 118 and axis of rotation 113. On the first or cutting portion of axis of rotation 113, bar 112 extends away from axis of rotation 113 and includes leading edge 116, lift feature 120, and end portion 124. On the opposing or counterweight portion of axis of rotation 113, bar 112 extends to counterweight 114. The counterweight portion of blade 110 is sized and weighted to balance (e.g., statically, dynamically, or both) the cutting portion of blade 110. The counterweight portion is not symmetrical with the cutting portion of blade 110 (i.e., counterweight portion is shaped differently than the cutting portion). Counterweight 114 is arranged so that the center of mass of blade 110 lies on axis of rotation 113, such that blade 110 is balanced about axis of rotation 113 in at least the x-direction (along longitudinal axis 111) and in the y-direction (along transverse axis 115). The mid-point of the length (i.e., one half of the length of blade 110 from the end of the counterweight portion to the end of the cutting portion) is located in the cutting portion of blade 110 because of the different lengths of the two portions of blade 110 (i.e., the counterweight portion is shorter than the cutting portion).

An outer portion 131 of blade 110 includes leading edge 116, trailing edge 135, and end portion 124. As shown in FIG. 2, both leading edge 116 and trailing edge 135 taper towards longitudinal axis 111 as they extend away from axis of rotation 113 towards the end of bar 112. Leading edge 116 and trailing edge 135 terminate in rounded end portion 124. Leading edge 116 and trailing edge 135 can be considered to be arcuate, curved, or bending. In other embodiments, trailing edge 135 is straight. In different embodiments, sharpened edge 139 may extend along at least a portion of leading edge 116, along the entirety of leading edge 116, along at least a portion of end portion 124, and/or along the entirety of end portion 124.

FIGS. 6-11 illustrate a mower blade 210 according to another exemplary embodiment. Blade 210 is similar to blade 110 described above. Accordingly, components of blade 210 referred to by numerals in the 200s are similar to components of blade 110 referred to by similar numerals in the 100s. Differences between blade 210 and blade 110 are described in more detail below.

Trailing edge 235 includes a sharpened edge 241. In different embodiments, sharpened edge 241 may extend along at least a portion of trailing edge 235, along the entirety of trailing edge 235, along at least a portion of end portion 224, and/or along the entirety of end portion 224. Sharpened edge 241 forms a bevel that can be angled either upwards or downwards relative to the axis of rotation 213 with respect to the normal operating orientation of blade 210. Sharpening or beveling at least a portion of trailing edge 235 to form sharpened edge 241 helps to reduce the noise produced by blade 210 in operation. It is believe that sharpened edge 241 improves the slipstream created by blade 210 by reducing its turbulence and thereby reducing noise. In some embodiments, trailing edge of counterweight 214 also includes a sharpened or beveled edge.

Lift feature 220 is a twisted region or twisted portion of bar 210. Twisted portion includes an inboard section 255 and an outboard section 257. Each section 255 and 257 is twisted about longitudinal axis 211, or an axis substantially parallel to longitudinal axis, so that sections 255 and 257 are not coplanar with a base portion 251 that is substantially planar and includes mounting holes 218 and 222. Inboard section 255 is twisted in the opposite direction than outward section 257 (e.g. inboard section 255 is twisted clockwise, when viewed along longitudinal axis 211 from a point further outboard than outboard section 257 and outboard section 257 is twisted counterclockwise when viewed from the same point). As illustrated, the magnitude of the twist relative to horizontal (e.g. with reference to base portion 251) varies for each of sections 255 and 257. In other embodiments, the amount of twist for each section 255 and 257 relative to horizontal may be the same. In some embodiments, the vertical distance (i.e., as measured with respect to axis of rotation 213) from the uppermost point to the lowermost point of inboard section 255 is 0.403 inches. In some embodiments, the vertical distance (i.e., as measured with respect to axis of rotation 213) from the uppermost point to the lowermost point of outboard section 257 is 0.311 inches. In other embodiments, this vertical distance is 0.570 inches.

Cutting portion 217 is outboard from lift portion 219 relative to axis of rotation 213. In the cutting portion 217, leading edge 216 is lower than leading edge 216 in the planar regions of the lift portion 219 with respect to axis of rotation 213 when blade 210 is in its normal operating orientation.

FIGS. 12-15 illustrate a mower blade 310 according to another exemplary embodiment. Blade 210 is similar to blades 210 and 110 described above. Accordingly, components of blade 310 referred to by numerals in the 300s are similar to components of blades 210 and 110 referred to by similar numerals in the 200s and 100s, respectively.

Leading edge 316 is straight and terminates at rounded end portion 324. Similarly, sharpened edge 339 is straight except for a rounded portion along rounded end portion 324.

FIGS. 16-19 illustrate a mower blade 410 according to another exemplary embodiment. Blade 410 is similar to blades 310, 210, and 110 described above. Accordingly, components of blade 410 referred to by numerals in the 400s are similar to components of blades 310, 210, and 110 referred to by similar numerals in the 300s, 200s, and 100s, respectively.

Leading edge 416 and sharpened edge 439 are straight. Similarly, trailing edge 435 and sharpened edge 441 are straight End portion 424 terminates in a substantially flat tip 459 (i.e., substantially parallel to transverse axis 415. A notch 461 is formed in tip 459 at the end of tip 459 adjacent trailing edge 437. A notch 463 and a notch 465 are formed in trailing edge 437 near tip 459. Notch 463 extends further towards longitudinal axis 411 than notch 465. Notches 461, 463, and 465 help reduce the noise produced by blade 410 when in operation.

FIGS. 20-23 illustrate a mower blade 510 according to another exemplary embodiment. Blade 510 is similar to blades 410, 310, 210, and 110 described above. Accordingly, components of blade 510 referred to by numerals in the 500s are similar to components of blades 410, 310, 210, and 110 referred to by similar numerals in the 400s, 300s, 200s, and 100s, respectively.

Blade 510 is substantially symmetrical about axis of rotation 513 and does not include a counterweight similar to those of blades 110, 210, 310, and 410 (e.g., counterweight 214 of blade 210). Blade 510 includes two symmetrical outer portions 531, outer portion 531A and outer portion 531B. Each outer portion 531 includes a leading edge 533, a trailing edge 535, and an end portion 524. Leading edge 533 includes sharpened edge 539 and trailing edge 535 includes sharpened edge 241. Both leading edge 533 and trailing edge 535 are rounded and terminate in rounded end portion 524.

FIGS. 25-28 illustrate a mower blade 610 according to another exemplary embodiment. Blade 610 is similar to blades 510, 410, 310, 210, and 110 described above. Accordingly, components of blade 610 referred to by numerals in the 600s are similar to components of blades 510, 410, 310, 210, and 110 referred to by similar numerals in the 500s, 400s, 300s, 200s, and 100s, respectively.

Blade 610 is substantially symmetrical about axis of rotation 613 and does not include a counterweight similar to those of blades 110, 210, 310, and 410 (e.g., counterweight 314 of blade 310). Blade 610 includes longitudinal axis 611 that is substantially perpendicular to the axis of rotation 613 that extends through the blade's center of rotation. Transverse axis 615 is substantially perpendicular to both longitudinal axis 611 and axis of rotation 613. Blade 610 includes two outer portions 631, outer portion 631A and outer portion 631B. Each outer portion 631 includes leading edge 616, a trailing edge 635, and an end portion 624. Leading edge 616 is straight and terminates at rounded end portion 624. Similarly, sharpened edge 639 is straight except for a rounded portion along rounded end portion 624. Trailing edge 635 is rounded and terminates at rounded end portion 624. Trailing edge 635 includes sharpened edge 641. Blade 610 includes lift feature 620, which is illustrated in FIGS. 25-28 as a twisted region or twisted portion including an inboard section 655 and an outboard section 657. Each section 655 and 657 is twisted about longitudinal axis 611 or an axis substantially parallel to longitudinal axis 611. Alternatively, lift feature 620 may be an airfoil as illustrated in FIGS. 3-6.

Mower blades can be evaluated in terms of noise production and cutting effectiveness. Improving one may negatively impact the other. Therefore, blade design typically requires tradeoffs between noise production and cutting effectiveness. Blades designed for different uses (e.g., mulching, side discharge, bagging) also require different relative strengths with respect to noise production and cutting effectiveness. For example, cutting performance is of primary concern for a mulching mower blade.

A primary factor in cutting performance is the lift produced by the blade. The more lift produced in the cutting chamber, the more likely grass is stand or raise to a vertical position, which improves cutting performance. Lift also helps with cut-grass discharge for side discharge and bagging applications.

Noise production is believed to be affected by several factors including: blade width, blade thickness, amount of lift, blade end treatment, the trailing edge, and the clearance between the end of the blade and the sidewall of the mower deck. Reducing the blade width and the blade thickness may reduce noise production. Reducing lift may reduce noise production. A rounded blade end treatment (e.g., blades 110, 210, 310, 510, and 610) or a blade end treatment including slots (e.g., blade 410) may reduce noise production. A sharpened edge on the trailing edge of the blade (e.g., blades 210, 310, 410, 510, and 610) may reduce noise production. Increasing the gap between the end of the blade and the sidewall of the mower deck may reduce noise production.

Varying the noise production factors and the lift produced by the blade allows different embodiments of blades 110, 210, 310, 410, 510, and 610 to emphasize either reducing noise production or improving cutting effectives or be optimized for different uses (e.g., mulching, side discharge, bagging) while producing noise levels lower than a typical mower blade.

The construction and arrangement of the apparatus, systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, some elements shown as integrally formed may be constructed from multiple parts or elements, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

What is claimed is:

1. A mower blade, comprising:
   two symmetrical body portions disposed on either side of an axis of rotation, each body portion including;
      a straight leading edge having a first sharpened edge formed along at least a portion of the leading edge;
      a curved trailing edge having a second sharpened edge formed along at least a portion of the curved trailing edge, and
      a rounded end portion defining a midpoint at a distal end of each body portion, a sharpened curved portion between the straight leading edge and the midpoint, and a curved trailing portion between the midpoint and the trailing edge;
   wherein the two symmetrical body portions include a longitudinal axis, wherein each straight leading edge is parallel to and offset from the longitudinal axis, and each body portion tapers toward the rounded end portion.

2. The mower blade of claim 1, wherein each body portion includes a lift feature.

3. The mower blade of claim 2, wherein each lift feature comprises a twisted region.

4. The mower blade of claim 3, wherein each twisted region is twisted about the longitudinal axis.

5. The mower blade of claim 3, wherein each twisted region is twisted about an axis substantially parallel to the longitudinal axis.

6. The mower blade of claim 2, wherein each lift feature comprises an air foil.

7. The mower blade of claim 2, wherein each curved trailing edge tapers toward the longitudinal axis.

8. The mower blade of claim 7, wherein each lift feature comprises a twisted region.

9. The mower blade of claim 8, wherein each twisted region is twisted about the longitudinal axis.

10. The mower blade of claim 8, wherein each twisted region is twisted about an axis substantially parallel to the longitudinal axis.

11. The mower blade of claim 7, wherein each lift feature comprises an air foil.

\* \* \* \* \*